United States Patent [19]
McNinch, Jr. et al.

[11] 3,929,382
[45] Dec. 30, 1975

[54] SKID CONTROL SYSTEM

[75] Inventors: Joseph H. McNinch, Jr., Oak Park; John A. Urban, Livonia; Gary L. Hopkins, Southfield, all of Mich.

[73] Assignee: Eaton Corporation, Ohio

[22] Filed: May 10, 1974

[21] Appl. No.: 468,905

[52] U.S. Cl............................. 303/21 BE; 303/21 EB
[51] Int. Cl.².............................................. B60T 8/04
[58] Field of Search................ 188/181; 303/20, 21; 307/1 R; 317/5; 324/161–162; 340/53, 62, 262–263

[56] References Cited
UNITED STATES PATENTS

| | | | |
|---|---|---|---|
| 3,494,671 | 2/1970 | Slavin et al. | 303/21 P |
| 3,499,689 | 3/1970 | Carp et al. | 303/21 CG |
| 3,652,134 | 3/1972 | Hiscox | 303/21 CG |
| 3,756,663 | 9/1973 | Fink et al. | 303/21 BE |
| 3,794,389 | 2/1974 | Davis et al. | 303/21 P |
| 3,802,749 | 4/1974 | Carp et al. | 303/21 EB X |
| 3,870,378 | 3/1975 | Carp | 303/21 EB |

Primary Examiner—Trygve M. Blix
Assistant Examiner—Stephen G. Kunin
Attorney, Agent, or Firm—Teagno & Toddy

[57] ABSTRACT

A skid control system is provided for use with a vehicle having at least first and second spaced apart, independently rotatable wheels and having a braking system for applying braking forces to the wheels. A brake control device responds to an applied skid signal for controlling the braking system to release the braking forces on the wheels. A first logic circuit provides a skid signal when a predetermined percentage of the magnitude of a high wheel speed signal, representative of the faster of the two wheels, differs from that of a low wheel speed signal. A second logic circuit provides a skid signal when the greater of an average wheel deceleration signal, representative of the average deceleration of the two wheels, and a high wheel deceleration signal, representative of the deceleration of the faster wheel, is greater than a reference. An adaptive time delay circuit delays application of a skid signal to the brake control system for a time duration which varies in dependence upon the deceleration of the faster of the two wheels. A third logic circuit provides a skid signal when the acceleration of the faster wheel exceeds a reference acceleration level. An enabling circuit passes this skid signal only if another logic circuit has provided a skid signal.

18 Claims, 3 Drawing Figures

SKID CONTROL SYSTEM

This invention relates to the art of skid control systems for controlling braking forces applied to the wheels on a vehicle having a braking system, and, more particularly, to a skid control system for use with a vehicle having a pair of spaced apart independently rotatable wheels.

Whereas the invention will be described herein in conjunction with a vehicle having spaced apart, independently rotatable wheels mounted on a common axle, it is to be appreciated that the invention is not limited thereto and, for example, may be employed where the wheels are mounted on different axles, such as on different axles on a trailer of different axles on a truck or other combinations thereof.

This application is directed toward improvements in an anti-skid system such as that described and illustrated in copending U.S. application, Ser. No. 326,676, filed on Jan. 26, 1973, in copending divisional application Ser. No. 527,246, filed on Nov. 26, 1974, and in continuation application Ser. No. 528,218, filed on Nov. 29, 1974, now abandoned. The system disclosed in that application includes circuitry for providing a high wheel speed signal representative of the faster of two independently rotatable wheels and an average speed signal representative of the average speed of these wheels. A first logic circuit provides a skid signal when the differential wheel speed, as determined by comparing the average speed signal with the high speed signal, attains a particular level. A second logic circuit provides a skid signal when the deceleration of the faster wheel is greater than a reference deceleration level. A third logic circuit provides a skid signal when the acceleration of the faster wheel exceeds a reference acceleration level. In that system, however, a skid signal provided by the differential wheel speed logic circuit is delayed before being applied to the braking system to provide brake release.

It is an object of the present invention to provide an improved skid control system wherein a skid signal is provided when a predetermined percentage of the magnitude of high wheel speed signal differs from that of a low speed signal.

It is still a further object of the present invention to provide an improved skid control system wherein a skid signal is delayed before application to the brake control for a time duration which varies as a function of the high speed wheel.

It is a still further object of the present invention to provide an improved skid control system wherein a skid signal is provided when the greater of the average deceleration of the two wheels and the high wheel deceleration is greater than that of a reference.

It is a still further object to provide an improved skid control system as described in the previous paragraph such that when the skid signal results from the average deceleration being greater than the high wheel deceleration, then such a skid signal is delayed for a time duration depending upon the deceleration of the high speed wheel before application to the brake control to release braking forces.

It is a further object to provide an improved skid control system having a skid logic control for providing a skid signal when the acceleration of the faster wheel exceeds a reference and wherein this skid signal is applied to a brake control to release braking forces on the wheels only if a skid signal has been provided by another skid logic control.

The present invention contemplates that the skid control system be used with a vehicle having at least a pair of spaced apart, independently rotatable wheels and in which a braking system is provided for applying braking forces to the wheels. It is also contemplated that a brake control means be provided which responds to an applied skid signal for controlling the braking system to release the braking forces on the wheels. Still further, it is contemplated that a sensor means or the like provide first and second wheel speed signals having values respectively representative of the wheel speed of the first and second wheels.

In accordance with one aspect of the present invention, circuitry is provided for receiving the wheel speed signals and providing therefrom a high wheel speed signal representative of the speed of the faster wheel and a low wheel speed signal representative of the speed of the slower wheel. A logic circuit serves to provide a skid signal when a predetermined percentage of the magnitude of the high wheel speed signal is greater than the low speed signal.

In accordance with a more limited aspect of the present invention, circuitry is provided for delaying application of the skid signal to the brake control means for a time duration which varies as a function of the high wheel speed signal.

In accordance with another aspect of the present invention, circuitry serves to provide an average wheel deceleration signal having a value in dependence upon the average deceleration of the first and second wheels and a high wheel deceleration signal having a value in dependence upon the deceleration of the faster of the two wheels. A logic circuit serves to provide a skid sign 1 when the greater of the average deceleration signal and the high wheel deceleration signal is greater than that of a reference.

In accordance with a more limited aspect of the present invention, as stated in the previous paragraph, a skid signal resulting when the greater signal is the average deceleration signal is delayed before application to the brake control means for a time duration in dependence upon a function of the high wheel speed signal.

In accordance with another aspect of the present invention, a first logic circuit utilizes at least one of the wheel speed signals for providing a skid signal when it is indicative of an incipient skid condition of the associated wheel. A second logic circuit provides a skid signal when the acceleration rate of the faster of the two wheels exceeds a predetermined acceleration. An enabling circuit is connected to the output of the second logic circuit and prevents passage of the skid signal provided thereby unless the first logic circuit provides a skid signal.

BRIEF DESCRIPTION OF THE DRAWINGS

The foregoing objects and advantages of the invention will become more readily understood from the following description of the preferred embodiment of the invention as taken in conjunction with the accompanying drawings which are a part hereof and wherein.

GENERAL DESCRIPTION

Figure 1:
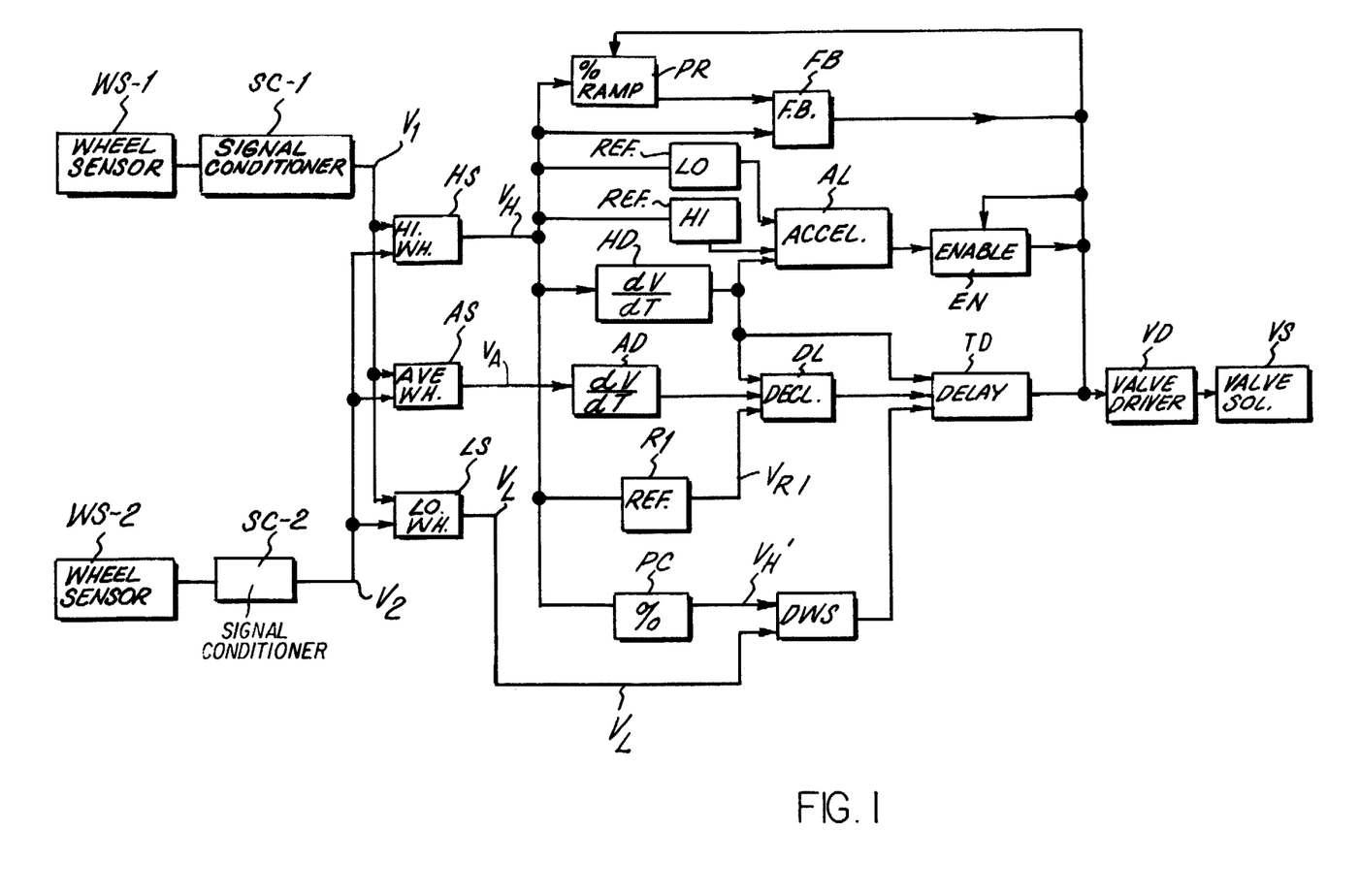
FIG. 1 is a block diagram illustration of the skid control system constructed in accordance with the present invention.

Referring now to the drawings wherein the showings are for purposes of illustrating a preferred embodiment of the invention only and not for purposes of limiting same, FIG. 1 is a block diagram illustration of the skid control system constructed in accordance with the present invention. It is contemplated that the skid control system disclosed herein be used in controlling the brake forces applied to spaced apart, independently rotatable wheels. These wheels may be located on a common axle or on different axles.

In general, this skid control system serves to monitor the wheel speed of a pair of independently rotatable wheels and develop a control signal, referred to hereinafter as a skid signal, if one or more conditions prevail indicative of an incipient or actual skid condition. This skid signal is used to actuate a valve driver circuit which, in turn, energizes a solenoid which acts on the braking system to relieve brake forces. The vehicle's brakes may be air-pressure operated or hydraulic operated, and in either case, it is contemplated that upon sensing an incipient skid condition, the brake forces on the wheels are relieved to prevent wheel lock-up.

Referring now to FIG. 1, the skid control system employs wheel sensors WS-1 and WS-2 for respectively sensing the wheel speeds of two independently rotatable wheels to be controlled. Any suitable mechanism may be employed for sensing wheel speed. Preferably, however, each wheel speed sensor employs a tachometer generator for developing an alternating signal having a frequency proportional to wheel speed. The frequency signals developed by sensors WS-1 and WS-2 are respectively applied to signal conditioning circuits SC-1 and SC-2. Each signal conditioning circuit includes a frequency to voltage converter for developing a DC signal having a magnitude proportional to the applied frequency signal and, hence, to the wheel velocity. Whereas the embodiment of the invention to be described herein contemplates that an analog DC signal be provided representative of wheel speed, it is to be appreciated that the signal conditioners may embody digital circuits to provide digital signals having values respectively representative of the wheel speeds of the first and second wheels. In the embodiment herein, it is contemplated that each DC wheel speed signal be of a particular polarity, such as positive polarity. The wheel velocity signals provided by signal conditioners SC-1 and SC-2 are respectively referred herein as wheel speed signals $V_1$ and $V_2$.

Wheel speed signals $V_1$ and $V_2$ are each applied to three wheel speed selector circuits comprising a high wheel speed selector circuit HS, an average wheel speed selector circuit AS, and a low wheel speed selector circuit LS. The high wheel speed selector HS serves to determine which wheel speed signal $V_1$ or $V_2$ is representative of the greater wheel speed and passes the greater signal, referred to hereinafter as the high wheel speed signal $V_H$. The average wheel speed selector AS is an averaging circuit which serves to receive the wheel speed signals $V_1$ and $V_2$ and provides an output signal $V_A$ having a magnitude representative of the average wheel speed. Similarly, the low wheel speed selector circuit LS receives the wheel speed signals $V_1$ and $V_2$ and selects the lower signal and passes this on as the low wheel speed signal $V_L$.

The high wheel speed signal $V_H$ is applied to a percentage circuit PC which provides an output signal having a magnitude which is a fixed percentage of the magnitude of the high wheel speed signal. This modified high wheel speed signal, which may be referred to hereinafter as $V_H'$, is compared against the low wheel speed signal $V_L$ in the differential wheel speed logic circuit DWS. This logic circuit provides a positive skid signal if the reduced high wheel speed signal $V_H'$ is greater than the low wheel speed signal $V_L$. This skid signal, however, is delayed by an adaptive time delay TD before being applied to a valve driver circuit VD which, in turn, actuates a valve solenoid VS to relieve the brake forces.

Figure 2:
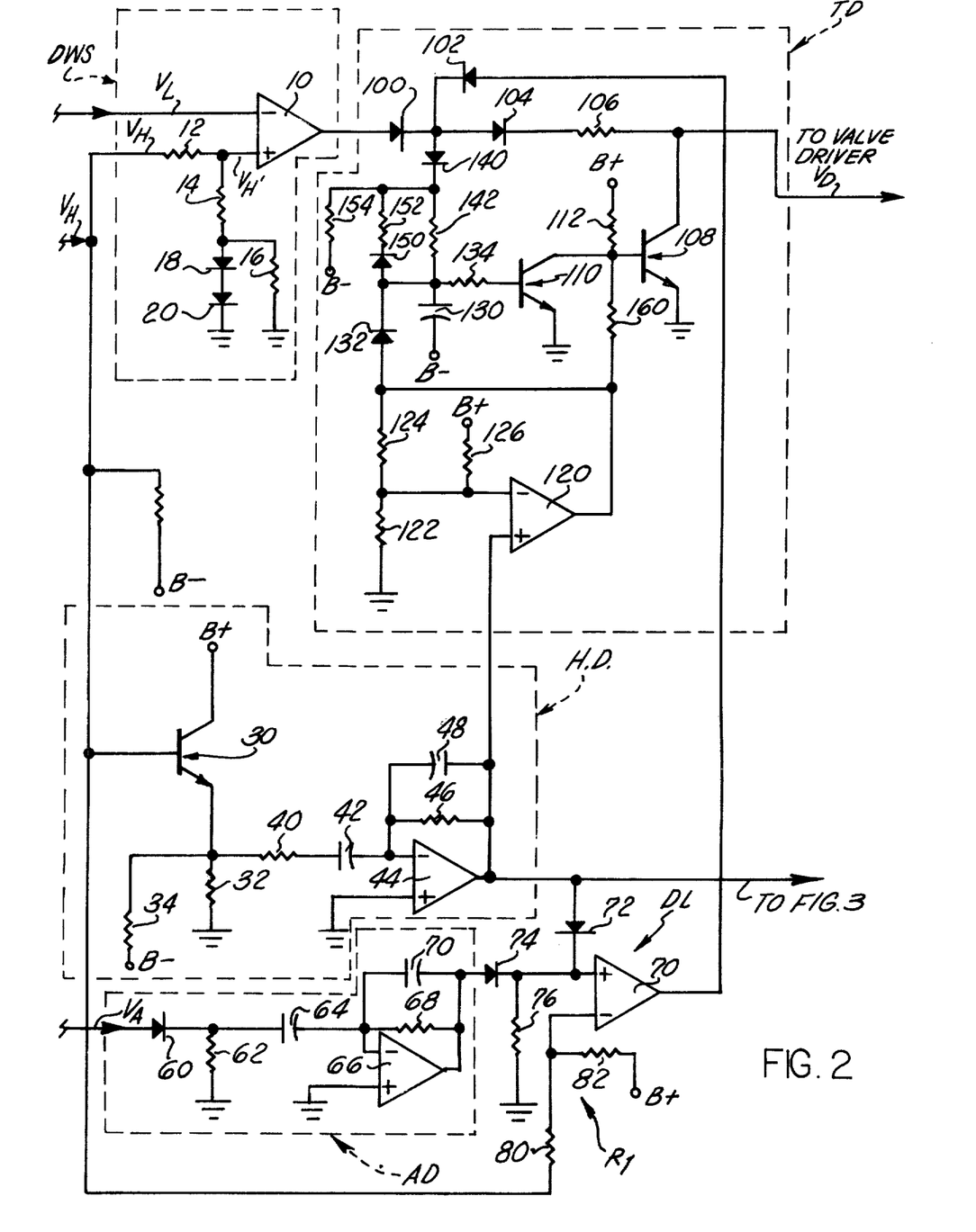
FIG. 2 is a schematic illustration of portions of the circuitry employed in the embodiment of the invention in FIG. 1; and, FIG. 3 is a schematic illustration of another portion of the circuitry employed in the embodiment of the invention of FIG. 2.

The average wheel speed signal $V_A$ is applied to a differentiator circuit AD which serves to provide an output signal having a magnitude representative of the rate of change of the average wheel speed. Similarly, the high wheel speed signal $V_H$ is applied to a differentiator circuit HD to provide an output signal having a magnitude representative of the rate of change of the faster wheel speed. The output signals obtained from differentiators HD and AD are applied to a deceleration logic circuit DL. This deceleraion logic circuit, as will be described in greater detail hereinafter with reference to FIG. 2, compares the greater of the signals taken from differentiators HD and AD against a reference signal $V_{R1}$, which varies in accordance with the speed of the faster wheel. If the greater signal is the average wheel speed deceleration signal and if this signal is greater than the reference, then a skid signal is provided. This skid signal is delayed by the adaptive time delay circuit DT for a time duration in dependence upon the magnitude of the deceleration of the faster wheel. The delayed skid signal is then applied to the valve driver circuit VD which, in turn, actuates the valve solenoid VS to relieve braking forces. If, however, the greater of the two deceleration signals is that obtained from differentiator circuit HD and if this is greater than the reference signal, a skid signal is provided by the deceleration logic circuit DL. This skid signal, as will be brought out in the description with respect to FIG. 2, is not delayed by the adaptive time delay circuit TD before being applied to the valve driver circuit VD to actuate the valve solenoid.

The differentiator circuit HD also applies its output signal to an acceleration logic circuit AL. As will be described in greater detail hereinafter with reference to FIG. 3, the acceleration logic circuit AL employs a two stage comparator by which a skid signal is provided if the acceleration of the faster wheel exceeds a low reference and then the skid signal is removed if the acceleration exceeds a high reference. However, the skid signal was previously developed by one of the other skid logic circuits, such as the fixed bleed circuit FB, or the differential wheel speed circuit DWS, or the deceleration logic circuit DL.

Figure 3:
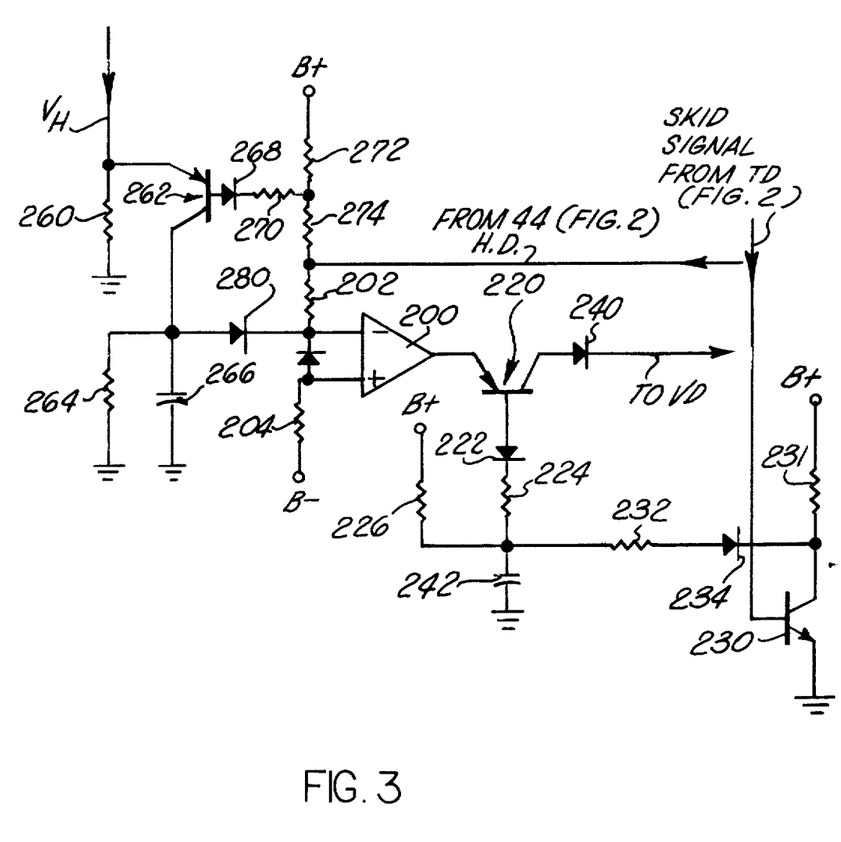

Having briefly described the general operation of the skid control system with reference to the block diagram of FIG. 1, attention is now directed to the more specific aspects of the circuitry with reference to FIGS. 2 and 3.

Differential Wheel Speed (DWS) Logic

The differential wheel speed logic circuit DWS is illustrated in detail in the upper left hand portion of FIG. 2. This circuit serves to provide a skid signal when a fixed percentage of the high wheel speed signal $V_H$ is greater than the low wheel speed signal $V_L$. The logic circuit includes an operational amplifier 10 which serves as a comparator to compare the magnitude of the reduced high wheel speed signal $V_H'$ with the low speed signal $V_L$. If signal $V_H'$ is greater, then the operational amplifier 10 provides a positive skid signal which is applied to a time delay circuit TD (see FIG. 1), which will then energize a valve driver circuit VD to actuate the valve solenoid VS. The reduced signal $V_H'$ is obtained from a percentage circuit which basically comprises a voltage divider including resistors 12, 14, and 16. Diodes 18 and 20 are connected in series across resistor 16. The high wheel speed signal $V_H$ is reduced in accordance with the magnitude of resistors 12 and 14 so that the reduced high wheel speed signal $V_H'$ is on the order of approximately ¼ of that of the magnitude of the high wheel speed signal $V_H$. Diodes 18, 20, and resistor 16 shape the percentage circuit at low speed to modify the DWS reference below 10 miles per hour to provide noise immunity. The values of resistors 12 and 14 are chosen such that when the high wheel speed signal represents a speed on the order of 10 MPH, and the difference between the high speed signal and the low speed signal $V_L$ is on the order of 7.5 MPH, then a skid signal will be provided. Similarly, a skid signal will be provided when the high speed signal is on the order of 20 MPH and the difference is on the order of 15 MPH. Also, when the high speed signal represents a speed on the order of 60 MPH, a skid signal will be provided when the speed difference is on the order of 45 MPH.

High Deceleration Circuit

The high deceleration circuit HD is illustrated in greater detail in FIG. 2. This circuit serves to receive the high speed wheel signal $V_H$ and provide an output signal that varies in accordance with the rate of change of the wheel speed signal so that the output signal is representative of acceleration or deceleration, depending on the direction of the rate of change. The high wheel deceleration circuit HD includes a low speed cutout circuit to avoid ripple noise at low speeds. This low speed cutout circuit, in effect, deactivates the differentiator circuitry for speeds below 5 MPH. This low speed cutout circuit includes an NPN transistor 30 having its base connected to receive the high wheel signal $V_H$ and its collector connected to a B+ voltage supply source. The emitter of this transistor is connected through a resistor 32 to ground and through a resistor 34 to a B— voltage supply source. The components are chosen such that the voltage level at which the low speed cutoff occurs is determined by the offset voltage and the base emitter drop of transistor 30. This is chosen to be on the order of 5 MPH. High wheel speed signals above this level are passed by resistor 40 and coupled through a capacitor 42 to the inverting input of an operational amplifier 44 having its non-inverting input connected to ground. This operational amplifier is provided with a parallel RC feedback path between its output and its inverting input with this path including a resistor 46 and a capacitor 48. This circuitry defines a differentiator to provide a derivative function so the output signal exhibits a value in accordance with the rate of change of the input signal applied thereto. The circuitry is such that a positive going output signal is representative of deceleration and a negative going signal is representative of acceleration.

As best shown in FIG. 1, the output of the high wheel speed differentiator circuit HD is applied to the time delay circuit TD as well as to the deceleration logic circuit DL and to the acceleration logic circuit AL.

Average Wheel Speed Differentiator Circuit

The average wheel speed differentiator circuit AD receives the average wheel speed signal $V_A$ and provides an output signal that varies in accordance with the rate of change of the average wheel speed. The output signal is positive going if the rate of change is deceleration and is negative going if the rate of change is acceleration.

A low speed cutout circuit assures that the differentiator is effectively inactive for low average wheel speed signals, such as those below 5 MPH. The low speed cutout is determined by a diode 60 which must be forward biased by the average wheel speed signal $V_A$ before the time varying signal can be applied to the differentiating circuitry. This requires a signal representative of at least 5 MPH.

The average wheel speed signal passed by diode 60 develops an input voltage across a resistor 62. This voltage is coupled through a capacitor 64 to the inverting input of an operational amplifier 66 having its non-inverting input connected to ground. This operational amplifier has a parallel RC circuit connected between its output circuit and its inverting input circuit. This RC network includes a resistor 68 and a capacitor 70. The output signal obtained from amplifier 66 is a voltage signal exhibiting a magnitude which varies with the rate of change of the average wheel speed signal $V_1$. If the rate of change is acceleration, then the output signal is a negative going signal. Conversely, if the rate of change is deceleration, then the output signal is a positive going signal. The output signal taken from the average wheel speed differentiator circuit AD, as best shown in FIG. 1, is applied to the deceleration logic circuit DL.

Deceleration Logic Circuit

The deceleration logic circuit DL receives the high wheel deceleration signal and the average wheel deceleration signal and determines which signal is the greater. The greater signal is compared against a reference signal, which varies with the high wheel speed. If the greater deceleration signal is, in turn, greater than the reference signal, a skid signal is provided. The deceleration logic circuit is illustrated in detail in the lower portion of FIG. 2.

The positive going high wheel deceleration signal taken from the output of amplifier 44 is applied to the non-inverting input of an operational amplifier 70 by means of a diode 72. Similarly, the positive going average wheel deceleration signal obtained from the output of amplifier 66 is applied to the noninverting input of operational amplifier 70 by means of a diode 74. Diodes 72 and 74 effectively serve as an OR gate to pass only the greater of the two deceleration signals. The greater signal is applied across an input resistor 76, connected between ground and the non-inverting input of amplifier 70. A variable reference signal $V_{R1}$ is applied to the inverting input of the operational amplifier from a reference circuit R1 (FIG. 1). The reference circuit is a voltage divider comprised of resistors 80 and 82. The high wheel speed signal is applied to this voltage divider and the junction of the divider is connected to the inverting input of amplifier 70. Consequently, the reference signal applied to amplifier 70 varies with the magnitude of the high wheel speed signal $V_H$. When the deceleration signal (the greater of that obtained from amplifiers 44 and 66), is greater than that of the reference signal, the operational amplifier 70 will provide a positive skid signal.

Time Delay Circuit

The time delay circuit TD may be termed as an adaptive time delay since it serves the function of delaying the skid signal obtained from the differential wheel speed logic circuit DWS or from the deceleration logic circuit DL for a time duration which varies as a function of the magnitude of the high wheel speed signal $V_H$. Specifically, the time duration varies as a function of the deceleration of the high speed wheel. The time delay is essentially 0 seconds at 0.5g deceleration and approximately 0.5 seconds with zero deceleration. As will be brought out in greater detail hereinafter, the time delay is also essentially zero seconds for a skid signal obtained from the deceleration logic circuit DL when the high wheel deceleration signal is greater than the average wheel deceleration signal.

The adaptive time delay circuit TD is illustrated in detail in FIG. 2. A skid signal provided by the differential wheel speed logic circuit DWS is applied to the circuitry through a diode 100 whereas a skid signal provided by the deceleration logic circut DL is applied through a diode 102. A skid signal obtained through diode 100 or diode 102, is applied to the valve driver circuit VD through diode 104 and resistor 106 only when an NPN transistor 108 is in a non-conducting condition. The delay timer circuitry normally maintains transistor 108 in a conductive condition to prevent a skid signal from being applied to the valve drive circuit VD.

Transistor 108 in the time delay circuit is held in a conductive condition so long as transistor 110 is in a nonconductive condition. Transistor 110 has its collector connected to the base of transistor 108 and this junction is, in turn, connected through a resistor 112 to a B+ voltage supply source. This maintains forward bias for transistor 108 until the bias is removed upon conduction of transistor 110.

The output voltage taken from amplifier 44 in the high wheel differentiator circuit HD is amplified and offset by an operational amplifier 120 in the time delay circuit TD. The offset and gain are determined by resistors 122, 124, and 126. The output taken from amplifier 120 is applied to the positive side of a capacitor 130 through a diode 132. Capacitor 130 is connected from a B— voltage supply source and through a resistor 134 to the base of transistor 110. Normally, the output voltage from amplifier 120 is several volts negative and this serves to keep transistor 110 in a non-conductive condition, thereby permitting transistor 108 to be conductive. This, in turn, provides a short circuit to ground for load resistor 106 to prevent a skid signal received through diode 100 or diode 102 from being applied to the valve drive circuit VD. When such a skid signal is received through either diode 100 or 102, it is applied through a diode 140 and thence through a resistor 142 to charge capacitor 130 in a positive direction. During this charging period, a diode 150 blocks current flow through resistor 152 in a biasing network made up of resistor 152 and resistor 154. When the charge on the capacitor 130 becomes sufficiently positive, (on the order of approximately +0.6 volts) transistor 110 will conduct, thereby removing the forward bias for transistor 108. Transistor 108 will become non-conductive removing the short circuit to ground for load resistor 106. With the resistor 106 now being ungrounded, a skid signal received through diode 100 or diode 102 will be passed through diode 104 and load resistor 106 to the valve driver circuit VD.

The delay which takes place after receipt of a skid signal and before the skid signal is passed is dependent on the output voltage taken from amplifier 120. If the deceleration of the high speed wheel increases, then a more positive signal is applied by amplifier 44 to the non-inverting input of amplifier 120. This results in a more positive voltage being applied to the positive end of capacitor 130 in the timing circuit and, hence, reduces the delay time before capacitor 120 becomes sufficiently positive to bias transistor 110 into a conductive condition. On the other hand, if the output obtained from amplifier 44 in the high wheel differentiator circuit HD is negative, representative of an acceleration condition of the high speed wheel, this will product a more negative going output from amplifier 120. This will reverse bias transistor 108 by means of a voltage divider circuitry comprised of resistor 112 and resistor 160.

Consequently then, it is seen that there is essentially no time delay during acceleration conditions of the high speed wheel. The components have been chosen such that this delay is essentially negligible with an acceleration level on the order of 0.1G. If the high speed wheel is in a deceleration condition, then the greater the deceleration, the shorter will be the time delay. The components have been chosen such that the delay is on the order of 0.4 seconds when the deceleration level is on the order of 0.1G and this delay will reduce to approximately 0.1 second when the deceleration has increased to a level on the order of 0.4G.

Acceleration Logic Circuit

The acceleration logic circuit is illustrated in detail in FIG. 3 to which reference is now made. The output of amplifier 44 in the high wheel differentiation circuit HD (FIG. 2) is applied to the inverting input of an operational amplifier 200 in the acceleration logic circuit through a resistor 202. The positive or non-inverting input for this operational amplifier is referenced to a negative level through a resistor 204 to a B— voltage supply source. The reference is set such that the output of amplifier 200 will go high to provide a positive skid signal only when the acceleration level of the high speed wheel exceeds the reference level, which is set at approximately 0.3G. This skid signal is applied to the valve driver circuit VD through the enabling circuit EN (FIG. 1) only if a previous skid signal exists.

The enabling circuit EN includes a PNP transistor 220 having its emitter-collector path connected to the output circuit of amplifier 200. Normally, this transistor is held in a non-conducting condition since its base circuit is referenced to a positive reverse biasing potential through a diode 222 and resistors 224 and 226 to a B+ voltage supply source. However, when a skid signal is provided by another skid logic circuit, such as the DWS circuitry or the deceleration logic circuitry DL (FIG. 2), such a skid signal is applied to drive an NPN transistor 230 into conduction. Current will flow from a B+ voltage supply source through a resistor 231 and thence through the collector to emitter circuit to ground. Since the collector of transistor 230 is connected to resistor 224 through a resistor 232 and a diode 234, the base of transistor 220 will be referenced to essentially ground potential. This then enables transistor 220 to pass a positive skid signal from the output of amplifier 200 and, thence, through the emitter to collector path of transistor 220 and through a diode 240 to the valve driver circuits VD, This will energize the valve driver circuit and thereby actuate the valve solenoid vs. Capacitor 242, connected between ground and the junction of resistors 232 and 224, provides a memory effect in the enabling circuit. With no skid signal being present, capacitor 242 and the base of transistor 220 is held positive through resistor 226 to prevent turn on of transistor 220. Consequently then, it is seen that a skid signal obtained from the acceleration logic circuit is effective only if a previous skid signal is present.

The acceleration comparison function carried out by the acceleration logic circuit AL is a two stage comparison in that a skid signal is developed when the acceleration signal obtained from the high wheel differentiator circuit HD exceeds a low level representative of 0.3g. If, however, the acceleration increases sufficiently to attain a level representative of 1.0 at a speed of 25 MPH or 2.0g at a speed of 10 MPH, then an acceleration inhibitor circuit responds to this condition to inhibit the operational amplifier 200 from providing a skid signal. The circuitry to accomplish this inhibiting function is discussed below with reference to FIG. 3.

The high speed signal $V_H$ is applied across a load resistor 260 and, thence, to the emitter of a PNP transistor 262. The collector of this transistor is connected to an RC circuit comprised of a resistor 264 and a capacitor 266 which are connected together in parallel between ground and the collector of the transistor. The base of the transistor is normally referenced to a reverse biasing positive potential through a diode 268 and resistors 270 and 272 to a B+ voltage supply source. Consequently, the transistor is normally held in a non-conductive condition. The base of this transistor is connected to the output of amplifier 44 in the high wheel differentiator circuit through diode 268, resistor 270 and a resistor 274. During acceleration conditions, the output from amplifier 44 increases in a negative sense. When the acceleration becomes sufficiently great, transistor 262 will be biased into conduction causing a positive voltage to be developed across resistor 264. This voltage is applied through diode 280 to the inverting input of operational amplifier 200 so as to cancel the effect of the negative going output from operational amplifier 44 in the high wheel differentiator circuit. This will remove the positive skid signal from the output of amplifier 200. Capacitor 266 serves to provide a degree of memory on the inhibiting operation to cover the reverse transition.

Summary

From the foregoing description, it is seen then that the improved differential wheel speed logic circuit DWS provides a skid signal when a fixed percentage of the high wheel speed signal $V_H$ is greater than the magnitude of the low wheel speed signal $V_L$. This skid signal is obtained from the output of operational amplifier 10 and is applied through diode 100 to the time delay circuit TD. This is an adaptive time delay and serves to delay application of the skid signal to the valve driver VD for a time duration that is dependent upon the level of deceleration of the high speed wheel. The greater the deceleration, the shorter will be the time delay before the skid signal is applied to the valve driver circuit.

It is also seen from the foregoing description that a determination is made by the circuitry as to whether the high wheel deceleration signal obtained from amplifier 44 is greater or less than the average wheel deceleration signal obtained from amplifier 66. The greater of these two signals is passed by one of the diodes 72 and 74 to the operational amplifier 70. If this greater signal is, in turn, more positive than the reference signal applied to the inverting input of the amplifier, then a skid signal is provided. This skid signal is applied to the time delay circuit TD through diode 102. The time delay before application of the skid signal to the valve driver circuit VD is dependent on the level of deceleration of the faster wheel. The greater the deceleration, the shorter the time delay. Consequently, if the greater signal passed by diodes 72 and 74 is the high wheel deceleration signal, then the time delay is essentially zero.

Lastly, it is seen from the foregoing description that the acceleration logic circuitry (FIGS. 1 and 3) applies a skid signal to the valve driver circuit VD when the acceleration of the faster wheel exceeds a reference acceleration level. However, that skid signal is applied to the valve driver circuit only if another skid signal is present to enable the enabling circuit EN.

Although the invention has been described in conjunction with a preferred embodiment, it is to be appreciated that various modifications may be made without departing from the spirit and scope of the present invention as defined by the appended claims.

I claim:

1. A skid control system for use with a vehicle having at least first and second spaced apart independently rotatable wheels and having a braking system for applying braking forces to said wheels and comprising:
   brake means responsive to an applied skid signal for controlling said braking system to relieve the braking forces on said wheels;
   means for providing first and second wheel speed signals having values respectively representative of the wheel speed of the first and second wheels;
   means for receiving said wheel speed signals and providing therefrom a high wheel speed signal representative of the speed of the faster wheel and a low wheel speed signal representative of the speed of the slower wheel; and
   logic circuit means for providing a skid signal when a predetermined percentage of the magnitude of the high wheel speed signal differs from that of the low wheel speed signal, and wherein said logic circuit means includes first circuit means for deriving a percentage signal having a magnitude which is a fixed percentage of the magnitude of said high wheel speed signal, and signal comparing means for comparing the magnitude of said percentage signal with that of said low speed signal and providing a skid signal when the percentage signal exhibits a greater magnitude than said low speed signal, and further including means for delaying application of said skid signal to said brake control means for a time duration that varies as a function of the speed of the faster wheel.

2. A skid control system as set forth in claim 1, wherein said delaying means includes circuit means for delaying application of said skid signal for a time duration which varies inversely with deceleration of said faster wheel.

3. A skid control system as set forth in claim 1, including circuit means for developing a high wheel deceleration singal having a value representative of the deceleration of said faster wheel, and said delaying means includes circuit means responsive to said high wheel deceleration signal for delaying application of a said skid signal to said brake means for a time duration which varies inversely with the value of said high wheel deceleration signal.

4. A skid control system as set forth in claim 3, wherein said circuit means includes skid signal gating means interposed between said logic circuit means and said brake control means, said gating means having a normal high impedance condition preventing passage of a said skid signal and an actuated low impedance condition for passing a said skid signal for application to said brake control means, and timing means responsive to a said skid signal for timing a delay period dependent on the value of said high wheel deceleration signal and then actuating said gating means to its said low impedance condition.

5. A skid control system as set forth in claim 3 and further comprising low speed cutoff means connected to receive said high wheel speed signal from said means for providing a high wheel speed signal, said cutoff means being connected for providing a signal to said high wheel deceleration circuit means, and operative for effectively blocking said high wheel speed signal for wheel speeds of said faster wheel below a predetermined level.

6. A skid control system for a vehicle having at least first and second independently rotatable spaced apart wheels and having a braking system for applying braking forces to said wheels and comprising:
    brake control means responsive to a skid signal for controlling said braking system to relieve the braking forces on said wheels;
    means for providing first and second wheel speed signals having values respectively representative of the wheel speed of said first and second wheels;
    means responsive to said first and second wheel speed signals for providing an average wheel deceleration signal having a value in dependence upon the average deceleration of said first and second wheels;
    means for providing a high wheel deceleration signal having a value in dependence upon the deceleration of the faster of said first and second wheels; and
    logic circuit means for providing a skid signal when the greater of said average deceleration signal and said high wheel deceleration signal is greater than that of a reference signal.

7. A skid control system as set forth in claim 6 including means for providing a said reference signal having a magnitude which varies in dependence upon the speed of the faster wheel.

8. A skid control system as set forth in claim 6, including delay means for delaying application of said skid signal to said brake control means for a time duration which varies in dependence upon a function of the speed of the faster wheel.

9. A skid control system as set forth in claim 8, wherein said delay means includes circuit means responsive to a said skid signal for delaying application of said skid signal for a time duration dependent on the deceleration level of the faster wheel.

10. A skid control system as set forth in claim 9, wherein said circuit means includes skid signal gating means interposed between said logic circuit means and said brake control means, said gating means having a normal signal blocking condition for preventing passage of a skid signal from said logic circuit means to said brake control means and an actuated skid signal passing condition for passing a said skid signal for application to said brake control means, and timing means responsive to a said skid signal for timing a delay period dependent on the value of said high wheel deceleration signal and then actuating said gating means to its said skid signal passing condition.

11. A skid control system for use with a vehicle having at least first and second spaced apart independently rotatable wheels and having a braking system for applying braking forces to said wheels and comprising:
    brake control means responsive to a skid signal for controlling said braking system to release the braking forces on said wheels;
    means for providing first and second wheel speed signals of values respectively representative of the wheel speeds of said first and second wheels;
    first logic circuit means for providing a said skid signal in dependence upon a given relationship of the values of said first and second signals;
    means for receiving said first and second signals and providing a third signal having a value representative of the wheel deceleration of the faster-rotating wheel of said first and second wheels, and providing a fourth signal having a value representative of the wheel deceleration of the slower-rotating wheel;
    second logic means for providing a said skid signal in dependence upon the value of at least one of said third and fourth signals; and
    time delay means for receiving a said skid signal from either said first or said second logic circuit means and delaying application of a said received skid signal to said brake control means for a time interval, said time delay means also receiving said third signal and including means for controlling the duration of said time interval to vary as a function of the value of said third signal.

12. A skid control system as set forth in claim 11 including means for receiving said first and second wheel speed signals and providing therefrom a high wheel speed signal representative of the speed of the faster wheel and a low speed signal representative of the speed of the slower of said two wheels and wherein said first logic circuit means includes means for providing a skid signal when a predetermined percentage of the magnitude of the high wheel speed signal differs from that of the low speed signal.

13. A skid control system for use with a vehicle having at least first and second spaced apart independently rotatable wheels and having a braking system for applying braking forces to said wheels and comprising:
    brake means responsive to an applied skid signal for controlling said braking system to relieve the braking forces on said wheels;
    means for providing first and second wheel speed signals having values respectively representative of the wheel speed of the first and second wheels;
    means for receiving said wheel speed signals and providing therefrom a high wheel speed signal representative of the speed of the faster wheel and a low wheel speed signal representative of the speed of the slower wheel; and logic circuit means for providing a skid signal when a predetermined percentage of the magnitude of the high wheel speed signal differs from that of the low speed, and including means for delaying application of said skid signal to said brake control means for a time duration which varies as a function of the speed of the faster wheel.

14. A skid control system for use with a vehicle having at least first and second spaced apart independently rotatable wheels and having a braking system for applying braking forces to said wheels and comprising:

brake means responsive to an applied skid signal for controlling said braking system to relieve the braking forces on said wheels;

means for providing first and second wheel speed signals having values respectively representative of the wheel speed of the first and second wheels;

means for receiving said wheel speed signals and providing therefrom a high wheel speed signal representative of the speed of the faster wheel and a low wheel speed signal representative of the speed of the slower wheel; and logic circuit means for providing a skid signal when a predetermined percentage of the magnitude of the high wheel speed signal differs from that of the low wheel speed signal; and including low speed cut-off means for effectively disabling said logic circuit means for wheel speeds of said faster wheel below a predetermined level, and further including means for delaying application of a said skid control signal to said brake control means as a function of the speed of the faster wheel.

15. A skid control system for use with a vehicle having at least first and second spaced apart independently rotatable wheels and having a braking system for applying braking forces to said wheels and comprising:

brake control means responsive to a skid signal for controlling said braking system to release the braking forces on said wheels;

means for providing first and second wheel speed signals of values respectively representative of the wheel speeds of said first and second wheels;

first logic circuit means for providing a said skid signal in dependence upon a given relationship of the values of said first and second signals;

means for receiving said first and second signals and respectively providing third and fourth signals having values respectively representative of the wheel deceleration of said first and second wheels;

said logic means for providing a said skid signal in dependence upon the value of at least one of said third and fourth signals; and time delay means for receiving a said skid signal from either said first or said second logic circuit means and delaying application of said received skid signal to said brake control means for a time duration which varies as a function of the faster of said first and second wheels, means responsive to said first and second wheel speed signals and providing an average deceleration signal having a value in dependence upon the average deceleration of said first and second wheels, means for providing a high wheel deceleration signal having a value representative of the deceleration of the faster of said first and second wheels, and wherein said second logic circuit means includes means for providing a said skid signal when the greater of said average deceleration signal and said high wheel deceleration signal differs from that of a reference signal.

16. A skid control system for use with a vehicle having at least first and second spaced apart independently rotatable wheels and having a braking system for applying braking forces to said wheels and comprising:

brake control means responsive to a skid signal for controlling said braking system to release the braking forces on said wheels;

means for providing first and second wheel speed signals of values respectively representative of the wheel speeds of said first and second wheels;

first logic circuit means for providing a said skid signal in dependence upon a given relationship of the values of said first and second signals;

means for receiving said first and second signals and respectively providing third and fourth signals having values respectively representative of the wheel deceleration of said first and second wheels;

second logic means for providing a said skid signal in dependence upon the value of at least one of said third and fourth signals; and time delay means for receiving a said skid signal from either said first or said second logic circuit means and delaying application of a said received skid signal to said brake control means for a time duration which varies as a function of the faster of said first and second wheels, and wherein said time delay means includes circuit means for varying said time delay inversely with variations in the deceleration of the high speed wheel.

17. A skid control system for use with a vehicle having at least first and second spaced apart, independently rotatable wheels and having a braking system for applying braking forces to said wheels and comprising:

brake means responsive to an applied skid signal for controlling said braking system to relieve the braking forces on said wheels;

means for providing first and second wheel speed signals respectively representative of the wheel speeds of said first and second wheels;

first logic circuit means for utilizing at least one of said first and second wheel speed signals to determine an incipient skid condition of at least one of said wheels and providing a first skid signal in dependence upon a said determination;

second logic circuit means for providing a second skid signal when the acceleration of the faster of said first and second wheels exceeds a first reference acceleration level; and said second logic circuit means including amplifier means having an output circuit for carrying a said second signal only when the acceleration of the faster wheel exceeds said first reference level;

means responsive to a said first skid signal for passing a said second skid signal for application to said brake control means, said passing means including circuit means interposed between said output circuit and said brake means for passing a said second skid signal, and means for inhibiting said second logic means from providing a said second skid signal when the acceleration of the faster wheel exceeds a second acceleration level representative of a greater acceleration than that of said first acceleration level.

18. A skid control system for use with a vehicle having at least first and second spaced apart, independently rotatable wheels and having a braking system for applying braking forces to said wheels and comprising:

brake means responsive to an applied skid signal for controlling said braking system to relieve the braking forces on said wheels;

means for providing first and second wheel speed signals respectively representative of the wheel speeds of said first and second wheels;

first logic circuit means for utilizing at least one of said first and second wheel speed signals to determine an incipient skid condition of at least one of said wheels and providing a first skid signal to said brake means to relieve said braking forces in dependence upon a said determination;

second logic circuit means for providing a second skid signal when the acceleration of the faster of said first and second wheels exceeds a first reference acceleration level;

said first logic circuit means comprising means for providing said first skid signal irrespective of said second skid signal;

means responsive to a said first skid signal for passing a said second skid signal for application to said brake control means to relieve said braking forces; and latching means connected with the output of said passing means and responsive to at least said second signal when said second signal is passed by said passing means, for maintaining said passing means in a passing condition to pass said second signal.

* * * * *

UNITED STATES PATENT AND TRADEMARK OFFICE
CERTIFICATE OF CORRECTION

PATENT NO. : 3,929,382
DATED : 12/30/75
INVENTOR(S) : J.H.McNinch, Jr.; J.A.Urban; G.L.Hopkins It is certified that error appears in the above—identified patent and that said Letters Patent are hereby corrected as shown below:

Col. 6, line 32: "$V_1$ should read "$V_A$".

Col. 9, line 9: "vs" should read "VS".

Signed and Sealed this sixteenth Day of March 1976

[SEAL]

Attest:

RUTH C. MASON
*Attesting Officer*

C. MARSHALL DANN
*Commissioner of Patents and Trademarks*